Aug. 14, 1928.
F. W. LEEVERS
1,680,743
ELECTRIC HEATING DEVICE
Filed Sept. 29, 1925 3 Sheets-Sheet 1
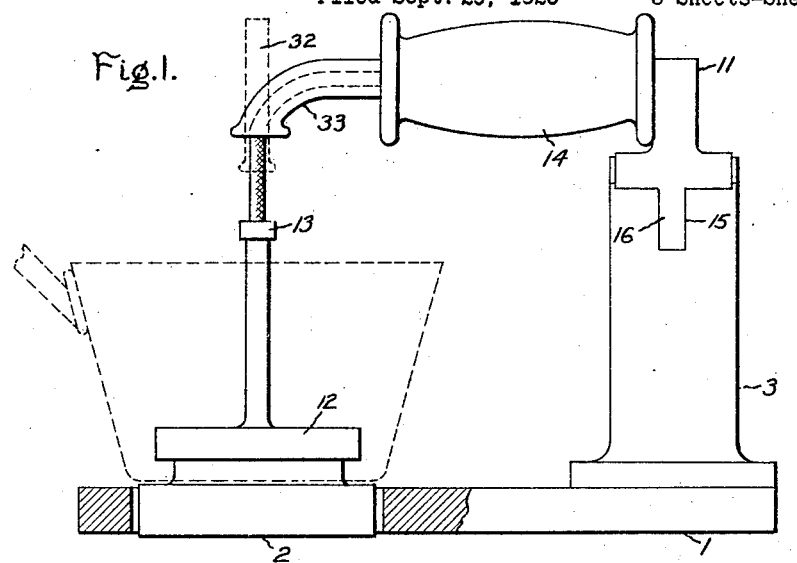
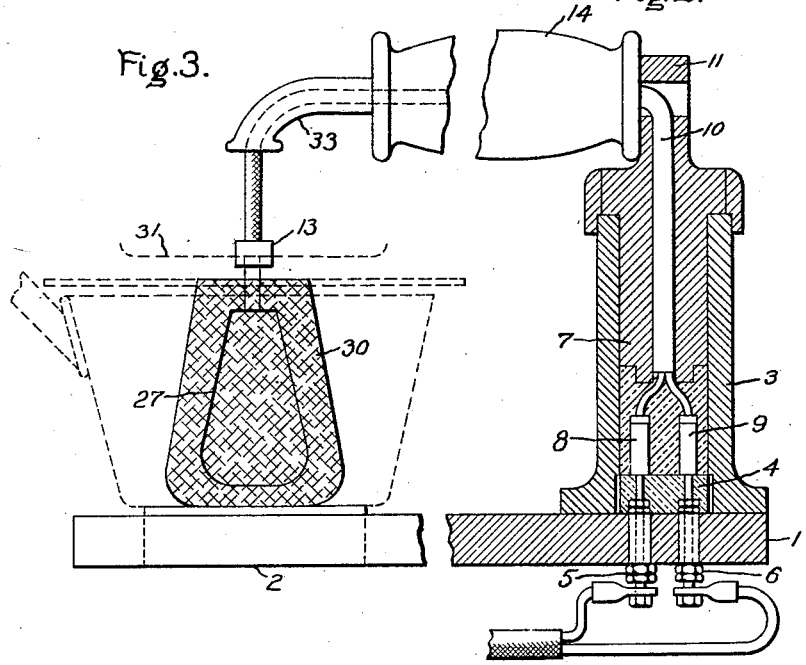
Inventor:
Frederic W. Leevers,
by
His Attorney.

Aug. 14, 1928.

F. W. LEEVERS 1,680,743

ELECTRIC HEATING DEVICE

Filed Sept. 29, 1925     3 Sheets-Sheet 2

Inventor:
Frederic W. Leevers,
by
His Attorney.

Aug. 14, 1928.　　　　　　　　　　　　　　1,680,743
F. W. LEEVERS
ELECTRIC HEATING DEVICE
Filed Sept. 29, 1925　　　3 Sheets-Sheet 3

Inventor:
Frederic W. Leevers,
by
His Attorney.

Patented Aug. 14, 1928.

1,680,743

UNITED STATES PATENT OFFICE.

FREDERIC WILLIAM LEEVERS, OF LONDON, ENGLAND, ASSIGNOR TO GENERAL ELECTRIC COMPANY, A CORPORATION OF NEW YORK.

ELECTRIC HEATING DEVICE.

Application filed September 29, 1925, Serial No. 59,298, and in Great Britain October 15, 1924.

This invention relates to electric heating devices, more particularly to electric heating or cooking devices for liquids. Ordinarily a heated plate is provided for boiling water or other liquids on which the utensil is placed. In such devices only the bottom of the vessel containing the liquid is in contact with the hot plate and consequently it takes a considerable time to raise the temperature of the whole body of liquid to the desired temperature.

The object of the present invention is to overcome this objection, and to that end it consists in providing an adjustable heating unit which is adapted to be immersed in the liquid, and which can be readily inserted and removed from the vessel containing the liquid, the act of removal serving to disconnect the heater from the supply circuit.

The invention further consists in providing means for preventing the immersion heater from coming into actual contact with any solid food which is being cooked in the liquid, by surrounding it with a perforated or solid sleeve or guard, which will allow of free access of the liquid but prevent solid matter from coming into contact with the heater.

In carrying this invention into effect I mount the immersion heater on the end of an arm which may be swung around until the immersion heater is directly over the receptacle containing the liquid to be heated and then depressed to lower the heater into the liquid, means being provided to close the circuit of the heater when the arm is depressed.

For a more complete understanding of my invention reference should be had to the accompanying drawings in which Fig. 1 is a side elevation view of an electric heater embodying my invention; Fig. 2 is a fragmentary sectional view of the device shown in Fig. 1, while Figs. 3, 4, 5 and 6 are views showing modifications of my invention.

Figure 4:
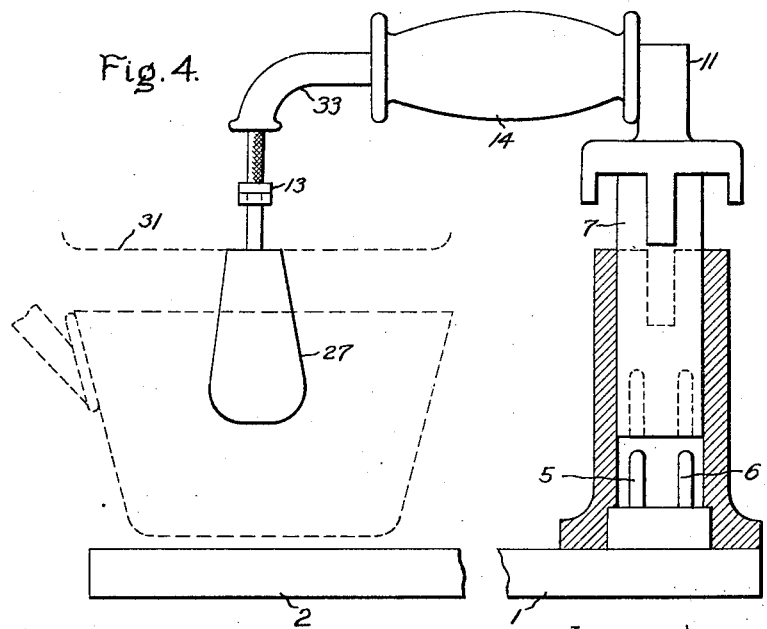

Referring to Figs. 1 and 2 of the drawings, 1 is an electric cooker top plate on which is mounted a tubular supporting member 3. In the bottom of this member is a porcelain base 4 on which is mounted two terminal pins 5 and 6. The lower ends of these terminals are connected to the electric supply source. Loosely fitting inside the member 3 is a plug socket 7. When this plug socket is pressed down connection is made with the terminal pins, which terminal pins thereby fit into socket terminals 8 and 9 carried by the plug socket 7. From these socket terminals 8 and 9 and up through the center of the plug 7 is threaded the insulated cable 10. This cable also passes through the center of the arm 11 which is secured to the upper end of the plug 7, being finally connected to the immersion heater 12 at the point 13. Upon the arm 11 is fashioned a handle 14 to facilitate pushing in or withdrawing the plug 7. The arm 11 can be screwed into the upper end of the plug 7 or it may be integral with same. To prevent the arm from being rotated when the plug 7 is forced downward a notch 15 is provided in the upper end of the member 3 into which fits a projection 16 on the plug 7 when the socket terminals 8 and 9 are in position to engage the pins 5 and 6. This notch is deep enough to ensure that when the plug is withdrawn and revolved away from the operating position so that the projection 16 rests on the upper end of the member 3, the plug is above the top of the terminal pins 5 and 6, as shown in Fig. 4.

Figure 5:
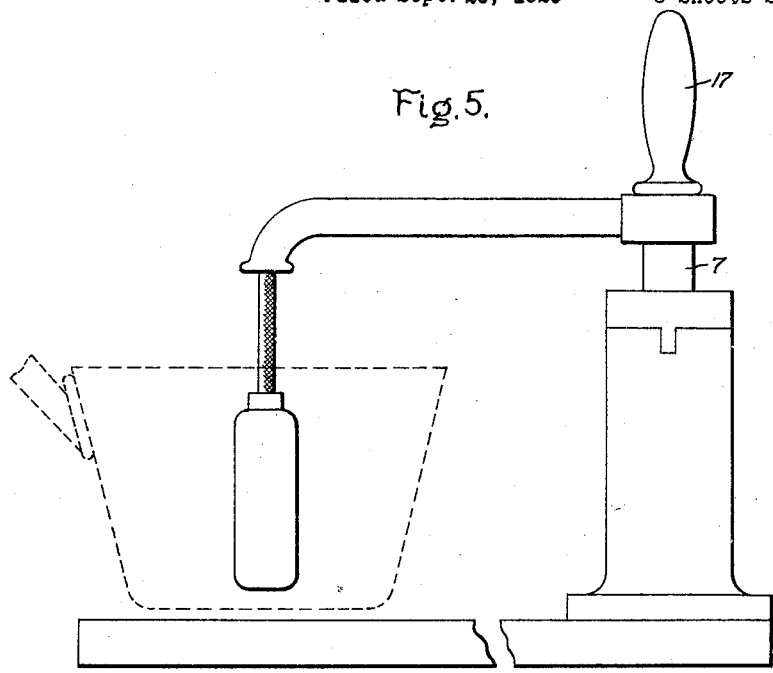

A modification is shown in Fig. 5. Here the handle 17 is in a vertical position directly above the plug socket 7, and in this position more direct pressure can be applied when pressing in or withdrawing the plug socket on to or from the terminal pins.

Figure 6:
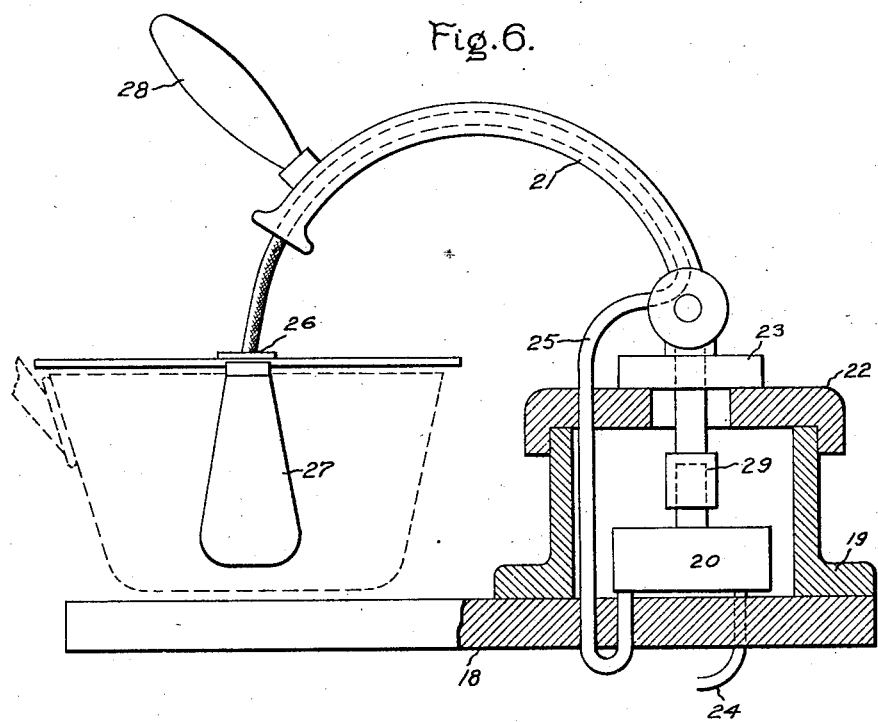

Another modification is shown in Fig. 6, in which 18 is the electric cooker top plate; 19 is a casing in which is provided a rotary or pressure operated switch 20. This switch is operated by revolving the arm 21. On the cover 22 of the box 19 is mounted the base 23 of the arm 21, which base is either a ball joint or an ordinary hinged joint which is free to revolve. The electricity supply is through the cable 24 to the bottom of the switch and it is led away from the switch by the cable 25, this cable passing up through the cover 22, as shown, and being led through the center of the arm 21 which is hollow. At the other end of the cable 25, namely at point 26, it is connected to the immersion heater 27 which can be of any desired shape.

The arrangement in Fig. 6 shows the immersion heater connected and being used in a saucepan. When the operation is finished, the arm is lifted by the handle 28 and then revolved to one side out of the way. This action of revolving the arm out of the way operates the switch 20 through the connection 29. In this modification it is possible to raise and lower the arm without cutting off the current as long as it is not revolved; but when the arm is revolved out of the way, the current is automatically cut off by means of the switch 20.

In any form, the arrangement can be used in conjunction with the electric hotplate 2 (Fig. 1) which is fitted in the top of the electric cooker top plate. The immersion heater may be of any particular shape, and to avoid contact with solids, such as when boiling potatoes in water, a mesh guard 30 (Fig. 3) is provided. This guard enshrouds the immersion heater and while the liquid keeps in contact with same the action of the guard prevents direct contact between the solids and the immersion heater. Further, the top of the immersion heater may be provided with a circular plate 31 whose action is to keep the effects of condensation from the arm 11 and cable 10. This plate 31 may be formed in the shape of a lid to the utensil in which case it would be made to maximum diameter with an adjustable hole in the center.

A clip 32 (Fig. 1) may be provided on the depending portion 33 of the cable 10 to enable the heating unit to be moved about in the liquid without burning the fingers.

What I claim as new and desire to secure by Letters Patent of the United States, is:

1. An electric heating device comprising an electric immersion heater, a support for said heater comprising an arm rotatable about a substantially vertical axis to a position above the liquid to be heated and arranged to be lowered to immerse the heater, means preventing the lowering of said arm until said arm has been rotated to said position above the liquid, and switching means arranged to open the circuit of said heater when said heater is removed from the liquid.

2. An electric heating device comprising a tubular support, switch contacts in the lower end of said support, a plug rotatably and slidably mounted in said support, switch contacts carried by said plug arranged to engage the switch contacts in said support, an arm secured to said plug, an electric immersion heater carried on the end of said arm electrically connected to the switch contacts carried by said plug, and means for securing said plug in a raised position until it has been rotated in said support to bring its switch contacts into alignment with the contacts on said support.

3. An electric heating device comprising a tubular supporting post provided with a vertical notch, switch contacts in the lower end of said post, a plug rotatably and slidably mounted in said post, switch contacts carried by said plug arranged to engage the contacts in said post, an arm secured to said plug in a substantially horizontal position, an electric immersion heater carried on the end of said arm electrically connected to the switch contacts carried by said plug, and a lug on said plug resting on the upper end of said post to prevent lowering of said arm until it has been swung to a position in which the contacts on said post and said plug are in alignment, when said lug enters said notch to provide for lowering of said plug.

In witness whereof, I have hereunto set my hand this 11th day of September, 1925.

FREDERIC WILLIAM LEEVERS.